Jan. 27, 1959 W. H. HOGUE 2,870,657
APPARATUS FOR SHARPENING SAWS
Filed July 19, 1957 3 Sheets-Sheet 1

INVENTOR.
WALTER H. HOGUE
BY
McMorrow, Berman + Davidson
ATTORNEYS

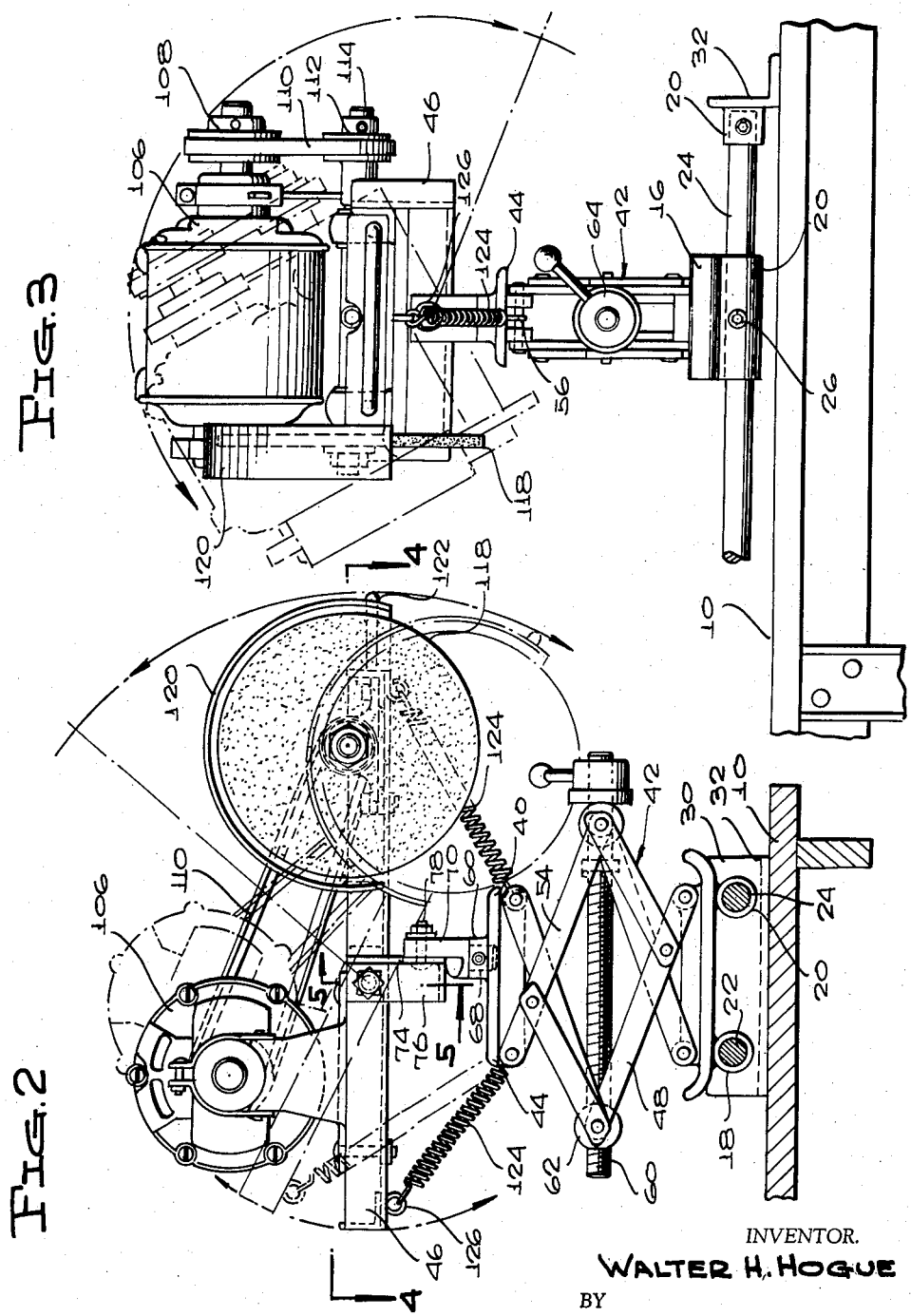

Jan. 27, 1959   W. H. HOGUE   2,870,657
APPARATUS FOR SHARPENING SAWS
Filed July 19, 1957   3 Sheets-Sheet 3
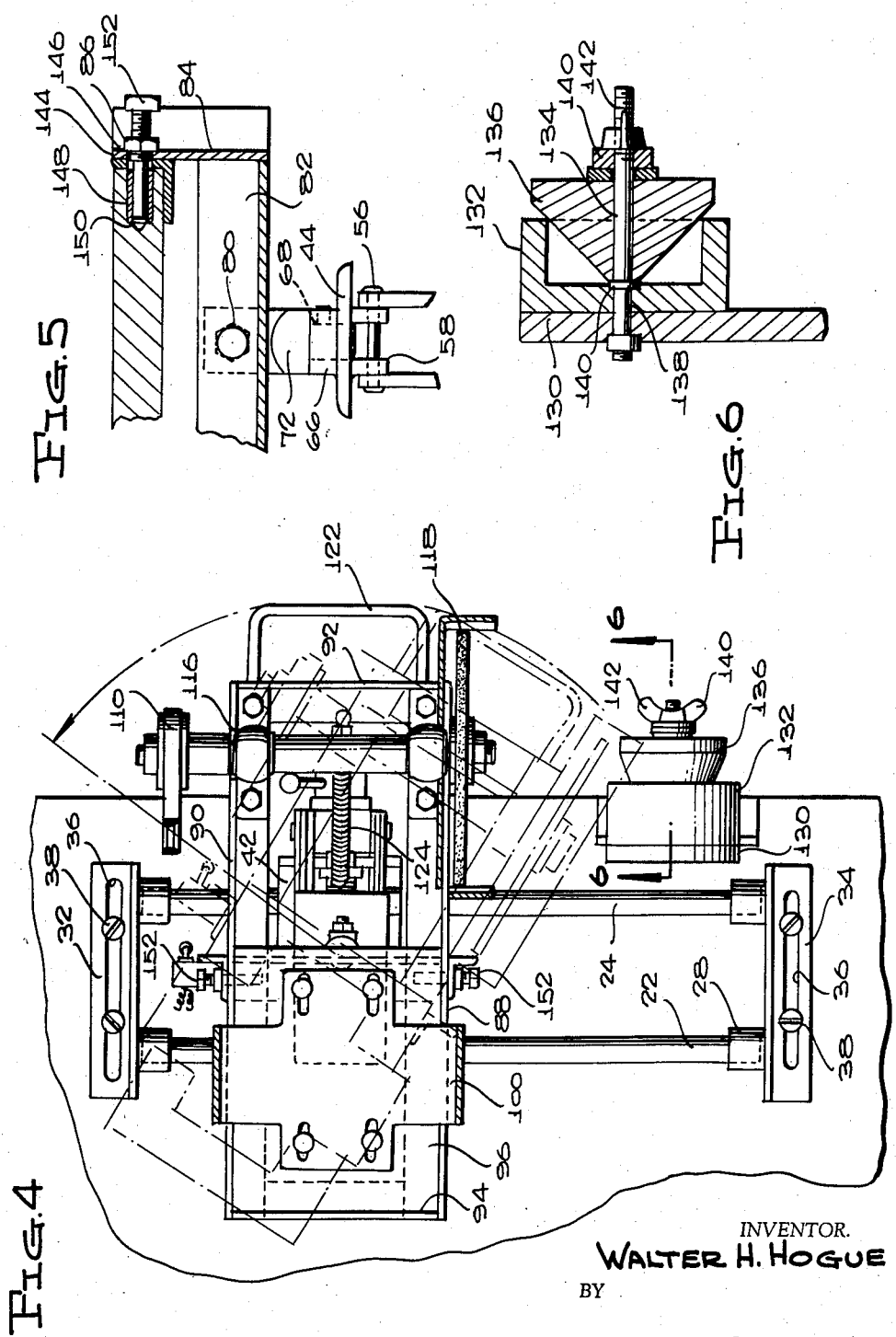
INVENTOR.
WALTER H. HOGUE
BY
McMorrow, Berman + Davidson
ATTORNEYS United States Patent Office 2,870,657
Patented Jan. 27, 1959

2,870,657

APPARATUS FOR SHARPENING SAWS

Walter H. Hogue, Elkins, W. Va.

Application July 19, 1957, Serial No. 672,958

8 Claims. (Cl. 76—40)

The present invention relates to improvements in saw sharpening apparatuses of the power operated type which are employed for grinding the teeth of saws, particularly, though not restrictively, of the rotary or circular type.

A primary object of the present invention is to provide an improved saw sharpener that can be easily moved into various angular positions relative to a saw, whereby the grinding wheel thereof can engage the teeth of the saw in different positions for the purpose of forming variously angled or beveled faces on the teeth and for grinding the inside of the shanks out square and also for the purpose of enabling the sharpener to be used for sharpening circular saws of varying and different diameters.

Another important object of the present invention is to provide a saw sharpener, which is mounted on a work bench that also supports mounting means for circular saws of different diameters, the saw sharpener being adjustable rectilinearly and curvilinearly on the bench for a compound axial and transverse straight line movement relative to the saw mount and for a compound curvilinear movement relative to the teeth of saws secured on the mount.

A further important object of the present invention is to provide an adjustable saw sharpener, which can be easily operated by a single operator and which can be dependably and accurately moved to the desired position for disposing and maintaining the grinder in a selected relation to the teeth of the saw, which relation can be easily maintained and adjusted in a very delicate or extreme manner.

A still further important object of the present invention is to provide a compact, simply constructed, easily and accurately operated and simply maintained saw sharpener, which can be inexpensively manufactured.

The foregoing and ancillary objects are attained by this invention, the preferred embodiment of which is set forth in the following description and illustrated in the accompanying drawings, wherein:

Figure 2 is a side elevational view, partly in section, of the saw sharpener and is taken on line 2—2 of Figure 1 and illustrates certain of the curvilinear movements of the saw sharpener about a horizontal axis;

Figure 3 is a front elevational view of the saw sharpener, illustrating certain of the curvilinear movements of the apparatus, about a horizontal axis;

Figure 4 is a horizontal sectional view, taken on line 4—4 of Figure 2, and illustrating certain of the curvilinear movements of the apparatus, about a vertical axis;

Figure 5 is a detailed, vertical sectional view, taken on line 5—5 of Figure 2 and illustrating certain of the pivot points for the saw sharpener;

Figures 1, 7:
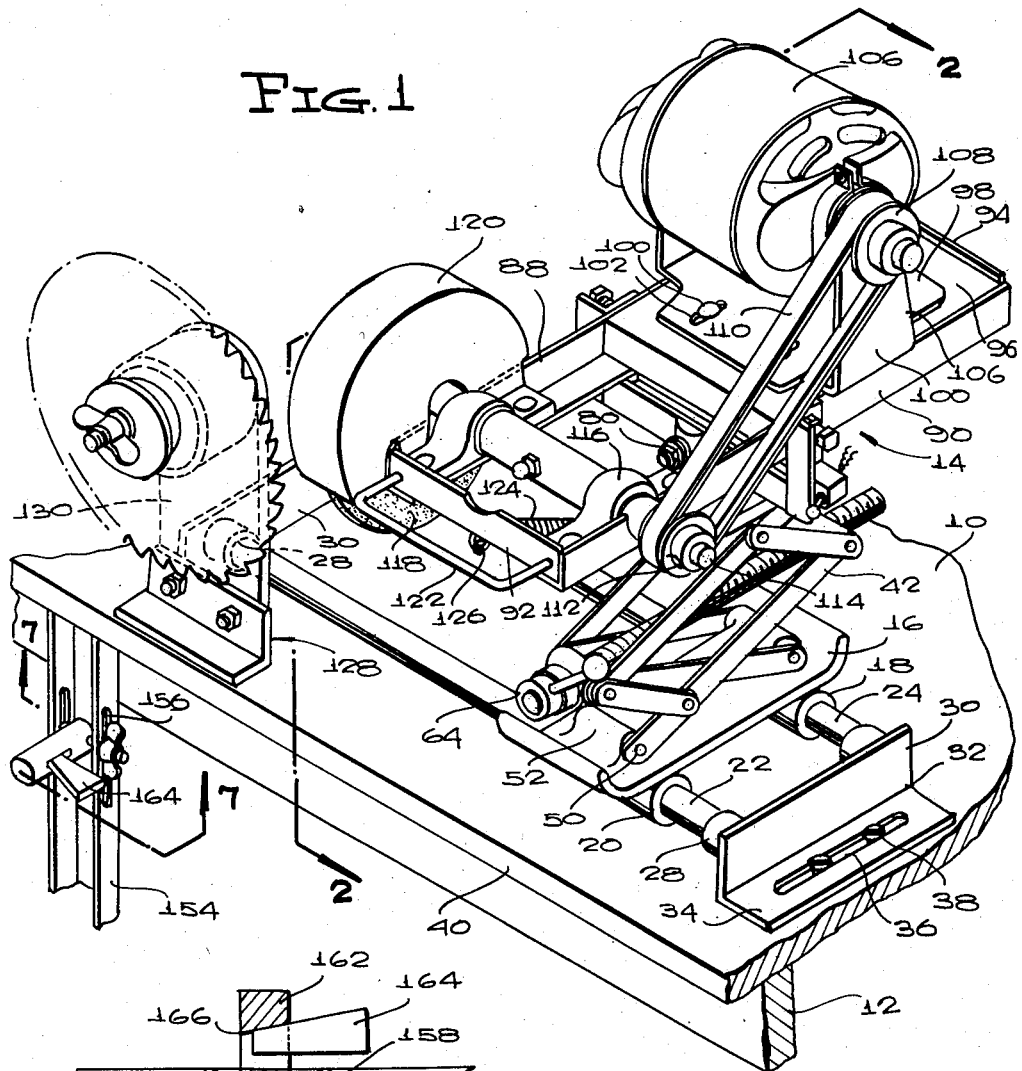
Figure 1 is a view in perspective of the saw sharpener of this invention, including the saw mount or supports, whereby circular saws are mounted on the work bench that supports the saw sharpener.

Figure 6 is a detailed, vertical sectional view, taken on line 6—6 of Figure 4, and illustrating the means for securing a circular saw to the saw support or mount, shown generally in Figure 4; and Figure 7 is a detailed, horizontal sectional view, taken on line 7—7 of Figure 1 and illustrating another saw mount or support for a larger diameter circular saw and showing in particular the means for mounting such saw in place.

Referring now more particularly to the accompanying drawings, the numeral 10 designates a flat top of a work bench 12 or similar support on which the saw sharpener generally designated by the numeral 14 is mounted. The saw sharpener 14 includes a supporting plate 16, which is slidably attached to the top 10 for rectilinear movement in a longitudinal direction. The supporting plate 16 is formed on its underside with parallel, longitudinally extending sleeves 18 and 20 that are slidably circumposed on a pair of rigid, parallel rods 22 and 24 and are fixed in adjusted position along the length of the rods by set screws 26, as shown in Figure 3. The rods 22 and 24 have their opposing ends socketed in sockets 28, which outstand from the vertical flanges 30 of a pair of angular brackets 32. The horizontal flanges 34 of the brackets are formed with slots 36, which extend longitudinally and are disposed slightly at an angle to the side edges of the horizontal mounting flanges 34. Screws 38 are passed through the slots and threaded into the table top 10 or otherwise suitably fixed thereto for adjusting the brackets on the top 10, toward and away from the front edge 40 thereof.

By virtue of the adjustable mounting brackets 32 and the sleeves 18 and 20, the supporting plate 16 is adjustable in a horizontal direction, longitudinally and transversely of the table top 10.

A scissors jack assembly 42 of conventional construction and operation is pivotally mounted at its lower end on the upper face of the supporting plate 16 and is pivotally attached at its upper end to the underside of a mounting plate 44 for a bed plate 46. The long, lower links 48 of the scissors jack assembly are pivoted by pins 50 to bearing blocks 52, which are formed integral with and upstand from the upper face of the supporting plate. The long, upper links 54 of the scissors jack assembly are pivotally attached by pins 56 to longitudinal flanges 58, which are arranged parallel on the underside of the mounting plate 44, as shown in Figure 5. The conventional operating screw 60 is attached to the connecting followers 62 between the upper and lower links of the scissors jack assembly and the outer end of the screw is provided with a handle carrying actuating collar 64, by means of which the screw can be rotated to raise and lower the scissors jack assembly. It is to be particularly noted that the actuating collar or element 64, with its radially extending handle, is disposed below and adjacent to the front end of the bed plate 46, as will be more particularly described, so that it is conveniently disposed for operation by the operator, standing in front of the front edge 40 of the supporting top 10.

As shown more particularly in Figures 2 and 5, the mounting plate 44 is formed with an upstanding collar 66, in which the lower dowel end 68 of a supporting pin 70 is rotatably socketed. The supporting pin 70 is formed with a flat upper side 72 and the web portion 74 of a channel bar 76 bears against the flat side 72 and is pivotally attached thereto by a pivot pin 78. The pin 70 is rotatable about a vertical axis, while the channel bar or link 76 is rotatable about the horizontal axis, defined by the pivot pin 78.

As shown more particularly in Figures 4 and 5, the upper end of the channel link 76 is fixed by a bolt assembly 80 to a cross bar 82. The cross bar 82 is formed at its end with upstanding supporting arms 84 to which the sides of the bed plate are pivotally attached, as at 86.

In this respect, the bed plate, as shown more particularly in Figures 1 and 4, includes angle iron side bars 88 and 90, which are connected at their opposing ends by angle iron end bars 92 and 94, the end bar 92 defining the front end of the bed plate. The inturned horizontal flanges of the side bars 88 and 90 support a block 96, on which the web 98 of a motor supporting bracket 100 is adjustably mounted by means of slots 102 and pins 104. An electric motor 106 is supported by the upper ends of the legs 107 and a pulley 108 is journalled on the protruding armature shaft of the motor. A belt 110 is passed over the pulley and the belt is adjusted by virtue of the slots and pins 102 and 104. The belt is connected to a pulley 112, which is fixed on the protruding end of a shaft 114, that is rotatably mounted in suitable bearing blocks 116 fastened on the inturned flanges of the side bars 88 and 90. A grinding wheel 118 is fixed on the opposite end of the shaft 114 and has its upper peripheral portion enclosed by a suitable protective hood 120.

An open U-shaped handle 122 is fixed in spaced relation to the vertical flange portion of the end bar 92 and is providde in order that the bed plate may be moved about the previously described pivot points to move the grinding wheel 118 relative to the circular saws, which are adapted to be mounted on suitable supports, as will be described. Coil springs 124 are connected between the pins 56 and suitable eyes 126, which depend from the horizontal flanges of the end bars 92 and 94 of the bed plate, as shown in Figures 1 and 2. The springs 124 are provided to maintain the bed plate in a normal level position and to return the bed plate to such position, when manual pressure is released from the handle 122.

A saw support 128 is positioned on the table top alongside the front edge 40 thereof. The support 128 includes a vertical plate 130, which parallels the front edge of the table top, and is suitably supported by a bracket that is attached to the table top. As shown in Figure 6, an annular support 132 is fixed by a bolt 134 to the front face of the plate 130 and cooperates with a conical fastener 136 in supporting the circular saw. The plate 130 and the back wall of the annular support are formed with aligned openings 138, to receive the bolt, and the back wall of the annular support is formed with a counter-sunk opening to receive a collar 140 on the bolt, whereby the bolt serves the dual purpose of fastening the annular support to the plate 130 and of securing the conical fastener 136 relative to the annular support, such securing being effected by suitable wing nuts 140 on the outer threaded end 142 of the bolt. It can be seen that the saw support positions the circular saw, as shown in Figure 1, at right angles to the normal, vertical plane of the grinding wheel 118. By grasping the handle 122, the operator can then move the bed plate about the vertical pivot, defined by the socket 66 and the dowel 68 and about the horizontal pivot, defined by the pivot 78. The bed plate can also be moved about the vertical axis, defined by the pivot 86. In this respect, as shown in Figure 5, the vertical flanges of the side bars 88 and 90 are formed with openings 144, which are alignable with openings 146, formed in the upper ends of the side bars 84. The block 96 is formed with aligned openings, within which sleeves 148 are positioned and the openings 144 and the sleeves 148 rotatably support the inner dowel ends 150 of bolts 152, which are threadably locked within the openings 146. Other suitable pivot constructions may be used.

The curvilinear movement of the bed plate is resisted by the springs, which, as aforestated, tend to return the bed plate to normal, level position. The bed plate, of course, is initially adjustable by virtue of the slide arrangement of the supporting plate 16, which includes the sleeves 18 and 20 and the adjustability of the supporting brackets 32. In addition, of course, the bed plate is vertically adjustable by virtue of the scissors jack assembly 42.

Another type of saw support is illustrated in Figures 1 and 7 and, as shown therein, a channel bar 154 is attached to the front side plate of the bench or frame for the top 10 and is so attached that it depends from the overhanging edge of the front of the table top. The sides of the channel bar are formed with transversely and longitudinally extending slots 156, within which a pin 158 is secured, the pin being slidable within the slots and being locked in adjusted position by the wing nut 160. The pin 158 carries a dowel 162, which is adapted to support a circular saw by being inserted within the hub thereof. The saw is locked in place on the dowel 162 by the locking wedge 164, which is adapted to be locked within the wedge shaped opening 166 formed within the dowel, as shown in Figure 7. Such type of saw support is provided for a circular saw of a larger diameter than the saw, which is mounted on the support 128.

While the sharpening apparatus of this invention is particularly intended for sharpening large lumber saws for sawing lumber, it is to be understood that it may be used for sharpening any type of circular saw, irrespective of the diameter or nature thereof and irrespective of the type of the sawing operation for which the saw is to be used. In this respect, the sharpening apparatus can be equally well used with other types of saws and it is to be particularly pointed out that, while the best known embodiment of the invention has been specifically described and illustrated herein, other forms may be realized as come within the appended claims.

Having thus described this invention, what is claimed is:

1. A saw sharpener comprising a support structure having a horizontal top, a supporting plate, means securing the supporting plate in adjustable positions on the top, a mounting plate, means adjustably attaching said mounting plate on the supporting plate, a bed plate having a motor means and a grinder wheel mounted thereon, means drivingly connecting said motor means to the grinder wheel, a handle element on the bed plate, means attaching the bed plate to the mounting plate and including means for adjusting said bed plate in curvilinear paths of movement about vertical and horizontal axes and spring means connected to opposite ends of the mounting plate and extending outwardly therefrom and connected to opposite ends of the bed plate for maintaining the bed plate in a normal level position.

2. A saw sharpener comprising a support structure having a horizontal top, a supporting plate, means securing the supporting plate in adjustable positions on the top, a mounting plate, means adjustably attaching said mounting plate on the supporting plate, a bed plate having a motor means and a grinder wheel mounted thereon, means drivingly connecting said motor means to the grinder wheel, a handle element on the bed plate, means attaching the bed plate to the mounting plate and including means for adjusting said bed plate in curvilinear paths of movement about vertical and horizontal axes and spring means between said bed plate and the mounting plate for maintaining the bed plate in a normal level position, said supporting plate having slide elements on its underside and said means securing the supporting plate in adjustable positions including said slide elements and cooperating slide elements mounted on the top and adjustable bodily thereon in a direction substantially transverse to the direction of sliding movement of the slide elements.

3. A saw sharpener comprising a support structure having a horizontal top, a supporting plate, means securing the supporting plate in adjustable positions on the top, a mounting plate, means adjustably attaching said mounting plate on the supporting plate, a bed plate having a motor means and a grinder wheel mounted thereon, means drivingly connecting said motor means to the grinder wheel, a handle element on the bed plate, means attaching the bed plate to the mounting plate and including means for adjusting said bed plate in curvilinear paths of movement about vertical and horizontal axes and spring means between said bed plate and the mounting plate for maintaining the bed plate in a normal level position, said supporting plate having slide elements on its underside and said means securing the supporting plate in adjustable positions including said slide elements and cooperating slide elements mounted on the top and adjustable bodily thereon in a direction substantially transverse to the direction of sliding movement of the slide elements, said slide elements on the supporting plate including sleeves and the slide elements on the top including rods.

4. A saw sharpener comprising a support structure having a horizontal top, a supporting plate, means securing the supporting plate in adjustable positions on the top, a mounting plate, means adjustably attaching said mounting plate on the supporting plate, a bed plate having a motor means and a grinder wheel mounted thereon, means drivingly connecting said motor means to the grinder wheel, a handle element on the bed plate, means attaching the bed plate to the mounting plate and including means for adjusting said bed plate in curvilinear paths of movement about vertical and horizontal axes and spring means between said bed plate and the mounting plate for maintaining the bed plate in a normal level position, said supporting plate having slide elements on its underside and said means securing the supporting plate in adjustable positions including said slide elements and cooperating slide elements mounted on the top and adjustable bodily thereon in a direction substantially transverse to the direction of sliding movement of the slide elements, said slide elements on the plate including sleeves and the slide elements on the top including rods and brackets supporting the ends of the rods and fixed by pin and slot means on the top to effect the bodily adjustment of the rods.

5. A saw sharpener comprising a support structure having a horizontal top, a supporting plate, means securing the supporting plate in adjustable positions on the top, a mounting plate, means adjustably attaching said mounting plate on the supporting plate, a bed plate having a motor means and a grinder wheel mounted thereon, means drivingly connecting said motor means to the grinder wheel, a handle element on the bed plate, means attaching the bed plate to the mounting plate and including means for adjusting said bed plate in curvilinear paths of movement about vertical and horizontal axes and spring means connected to opposite ends of the mounting plate and extending outwardly therefrom and connected to opposite ends of the bed plate for maintaining the bed plate in a normal level position, said means adjustably attaching said mounting plate on the supporting plate including a scissors jack assembly vertically connecting said plates.

6. A saw sharpener comprising a support structure having a horizontal top, a supporting plate, means securing the supporting plate in adjustable positions on the top, a mounting plate, means adjustably attaching said mounting plate on the supporting plate, a bed plate having a motor means and a grinder wheel mounted thereon, means drivingly connecting said motor means to the grinder wheel, a handle element on the bed plate, means attaching the bed plate to the mounting plate and including means for adjusting said bed plate in curvilinear paths of movement about vertical and horizontal axes and spring means connected to opposite ends of the mounting plate and extending outwardly therefrom and connected to opposite ends of the bed plate in a normal level position, said bed plate having a front end from which the handle element outstands and means for securing a circular saw to the support structure in a position normally normal to the vertical plane of the grinder wheel.

7. A saw sharpener comprising a support structure having a horizontal top, a supporting plate, means securing the supporting plate in adjustable positions on the top, a mounting plate, means adjustably attaching said mounting plate on the supporting plate, a bed plate having a motor means and a grinder wheel mounted thereon, means drivingly connecting said motor means to the grinder wheel, a handle element on the bed plate, means attaching the bed plate to the mounting plate and including means for adjusting said bed plate in curvilinear paths of movement about vertical and horizontal axes and spring means between said bed plate and the mounting plate for maintaining the bed plate in a normal level position, said spring means including coil springs connected to opposite ends of the mounting plate and extending outwardly therefrom and connected to opposite ends of the bed plate.

8. A saw sharpener comprising a support structure having a horizontal top, a supporting plate, means securing the supporting plate in adjustable positions on the top, a mounting plate, means adjustably attaching said mounting plate on the supporting plate, a bed plate having a motor means and a grinder wheel mounted thereon, means drivingly connecting said motor means to the grinder wheel, a handle element on the bed plate, means attaching the bed plate to the mounting plate and including means for adjusting said bed plate in curvilinear paths of movement about vertical and horizontal axes and spring means connected to opposite ends of the mounting plate and extending outwardly therefrom and connected to opposite ends of the bed plate for maintaining the bed plate in a normal level position, said attaching means for the bed plate including a first pin rotatably upstanding from the mounting plate and rotatable about a vertical axis, a second pin pivotally attached to the first pin for movement about a horizontal axis, means connecting the second pin to the bed plate and including a bracket attached to the second pin and means securing said bracket to the bed plate.

References Cited in the file of this patent

UNITED STATES PATENTS

| | | |
|---|---|---|
| 145,643 | Gibbs | Dec. 16, 1873 |
| 261,624 | Olney | July 25, 1882 |
| 327,294 | McFadden et al. | Sept. 29, 1885 |
| 2,479,978 | Smith | Aug. 23, 1949 |
| 2,811,873 | Nielsen | Nov. 5, 1957 |
| 2,811,874 | Rethoret | Nov. 5, 1957 |
| 2,824,468 | Nielsen | Feb. 25, 1958 |